May 23, 1967     I. J. DAVIES     3,321,246

SAFETY HARNESSES

Filed June 14, 1965     2 Sheets-Sheet 1

INVENTOR
Ivor John Davies
BY
Dowell M Dowell
ATTORNEYS

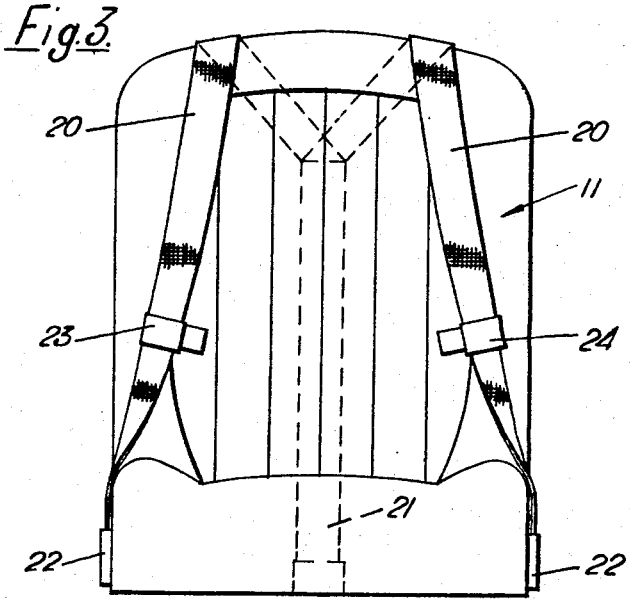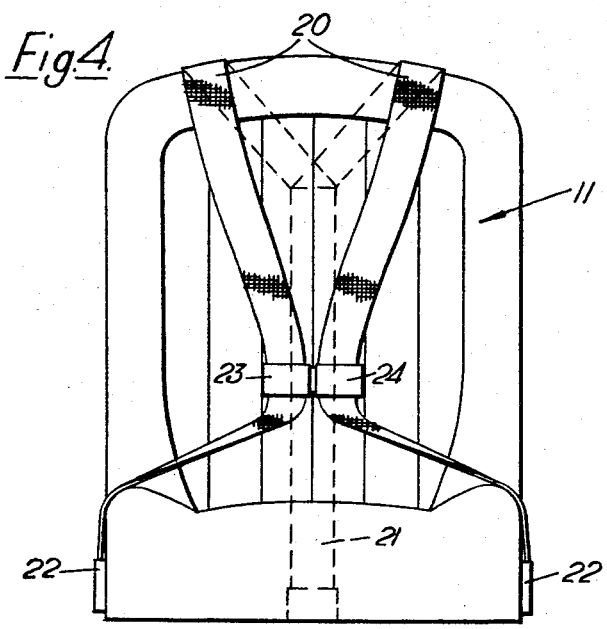

United States Patent Office 3,321,246
Patented May 23, 1967

3,321,246
SAFETY HARNESSES
Ivor John Davies, Thorpe Bay, Essex, England, assignor to Teleflex Products Limited, Essex, England, a British company
Filed June 14, 1965, Ser. No. 463,745
Claims priority, application Great Britain, June 11, 1964, 24,370/64
8 Claims. (Cl. 297—389)

This invention relates to safety harnesses, especially seat harnesses for travellers in motor cars.

Present harnesses as used in motor cars are subject to various disadvantages as will hereinafter be discussed. Also, whereas the present usual practice is for the harness straps to be anchored to strong points on the vehicle structure, the design trend is toward the fitting in motor cars of strong rigid safety seats that are themselves solidly secured to the vehicle structure and to which the harness can then be attached, at least in part. It is an object of the invention to provide a harness which is an improvement over those at present in use and which is adapted for employment on a safety seat.

It is recognised that to be complete in its protection a car seat harness should preferably comprise a strap or straps to prevent the occupant parting company with the seat, which function is commonly fulfilled by a lap strap, and also a strap or straps to prevent the seat occupant's body from jack-knifing forward and striking the vehicle instrument panel and windscreen. The second function is usually performed by a so-called diagonal strap extending from a point of attachment to the lap strap obliquely up and across the wearer's chest and one shoulder to a side anchorage point at about the level of the wearer's head.

Considering particularly the diagonal strap, it is usually provided as an extension of one of the two portions of the lap strap, this commonly being anchored to, for example, the door pillar of the vehicle. Its main disadvantages are that it requires to be very carefully fitted to the vehicle if it is not to constitute a risk, in certain types of vehicle collision, by coming into contact with the wearer's neck but it has to be adjusted manually by the wearer to the correct length, and when not in use it commonly hangs untidily at the side of the vehicle.

According to the present invention, a seat safety harness comprises twin shoulder straps to pass up over the seat occupant's shoulders, and a harness reel of the inertia type mounted centrally on or within the back or base of the seat to reel in said twin straps.

It will be understood that an inertia reel is one which permits the strap to unreel as required during normal movements of the seat occupant but locks the strap to prevent unreeling if the reel, or the strap issuing therefrom, is subjected to a sudden jerk as would be occasioned by a collision of the vehicle. Also such a device reels away any slack strap automatically under spring action. Thus, the need for manual adjustment of the straps is eliminated, and when not in use the straps will be reeled in so that they lie neatly against the front of the seat back.

Furthermore, the arrangement provides greater freedom to the wearer's ordinary movements than the conventional diagonal strap, while nevertheless the twin shoulder straps hold the wearer considerably more securely in the seat in the event of a collision of the vehicle.

In one form, the inertia reel may be a twin spool reel to receive the twin shoulder straps, with a common inertia lock for the twin spools. Alternatively, the inertia reel may have a single spool, with a single strap reeled thereon and descending from the top of the seat back, this single strap being divided so as to have a Y configuration with each of the arms of the Y forming a shoulder strap for the seat occupant.

Several forms of harness in accordance with the invention will now be described by way of example and with reference to the accompanying diagrammatic drawings, in which:

FIGURE 3 is a view of a seat equipped with a harness forming both shoulder straps and a lap strap, and FIGURE 4 shows the harness of FIGURE 3 connected for use.

Figure 1:
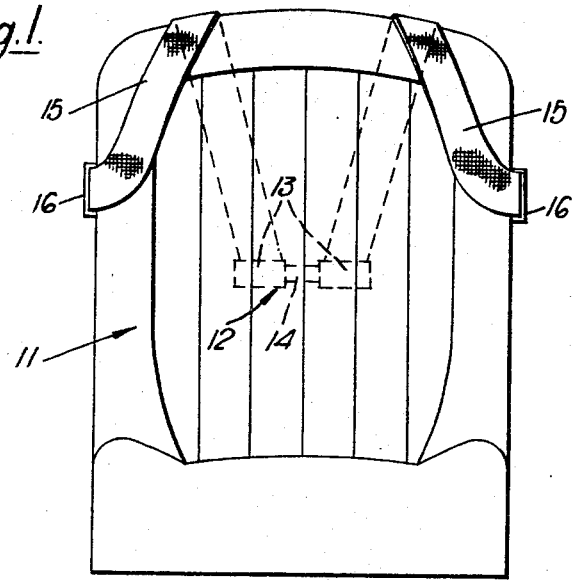
FIGURE 1 is a front elevation of a seat equipped with one form of harness.

Referring firstly to FIGURE 1, a seat 11 has mounted in the back an inertia reel 12 having twin spools 13 and a common inertia locking mechanism 14 acting on both spools, this reel being of the type that normally allows strap to be reeled off freely, against the action of a retraction spring, but which locks if there is a sudden abnormal pull on the straps, or either strap. From the twin spools 13, twin straps 15 run up the seat back, over the shoulders of the wearer (when the harness is in use) and then down and back under the arms of the wearer to anchorage points 16 on the seat back.

Figure 2:
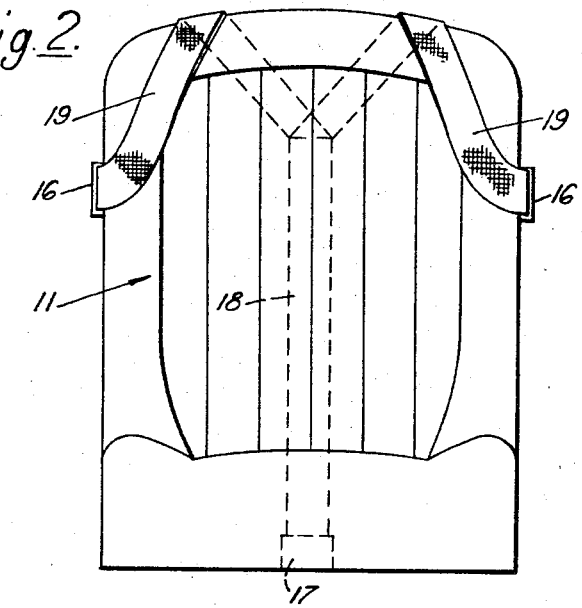
FIGURE 2 is a similar view of a seat equipped with a modified form of the harness.

In the version of the harness shown in FIGURE 2, a single spool reel 17 is employed in place of the double spool reel of FIGURE 1, and the twin straps are replaced by a single strap 18 issuing from the reel and dividing into a Y configuration at the top of the seat back to provide two strap arms 19 passing over the seat occupant's shoulders. Also, in this case an inertia reel of the type having a $g$ pendulum sensitive to vehicle accelerations is employed and therefore the reel is mounted in the base of the seat 11. The $g$ pendulum has to hang vertically and this would be liable to be upset by the rake adjustment of the seat back if the reel were in the seat back as before.

Since analysis of the injuries sustained by car occupants in collisions has shown that injuries to the lower limbs are substantially the same for all types of harness and not significantly greater when no harness is used, it is considered that shoulder straps alone will afford good protection. This leads to an arrangement of FIGURES 1 and 2 in which the two straps run back under the arms of the seat occupant to form shoulder loops with their ends anchored to the seat at points behind the armpits of the wearer. That provides a neat simple harness giving maximum upper torso restraint and with little sliding of the lower limbs it is entirely free of buckles. Also there are no straps crossing either the lap or the chest; this overcomes a difficulty with existing harnesses in that many persons, and female users especially, show a marked reluctance to accept body-crossing straps of the lap and diagonal kind.

However, if a lap strap is required the harness can readily be adapted to provide this. Thus, in the arrangement of FIGURE 3 the arms 20 of a Y strap 21 are led down and anchored to the lower part of the seat 11, at anchorage points 22 where a lap strap might ordinarily be anchored, and a two-part quick release connector 23, 24 is provided with one part free running on each strap arm 20. Then, if a seat occupant, having the strap arms passing over his shoulders, locks together the two parts of the connector in front of his body there is produced from the two Y strap arms 20 a complete lap strap and double shoulder strap as can be seen in FIGURE 4. The quick release connector 23, 24 must snub the straps to prevent pull-through under load and it is, of course, essential that it should permit the lap strap to tighten about the wearer's hips. The arrangement gives, in a simple way, complete body restraint of the kind associated with crew seats in aircraft.

Another way of providing a complete harness is to combine shoulder loops as in FIGURE 1 or FIGURE 2 with a retractable lap strap as featured in our copending patent application No. 473,978.

It is much to be preferred that any metal parts on the harness in front of the wearer's body should be eliminated, and it is also desirable that the material employed for the straps should be such as absorbs high energy when stretched under tension and displays a low elastic recovery. The recovery properties of materials such as nylon and terylene at present in use are rather better than is desirable.

I claim:

1. A seat safety harness, comprising retraction reel means of the inertia type mounted centrally at the back of a seat, said retraction reel means comprising rotatable strap-receiving spool means to receive a strap and reel it automatically on to said spool means under spring action, two strap anchorage points disposed at opposite sides of the seat below the level of the shoulders of an occupant of the seat, and two shoulder straps arranged to pass respectively over the two shoulders of a seat occupant and each having a first end secured to the strap anchorage point at its own side of the seat and a second end adapted to be reeled onto said strap-receiving spool means.

2. A seat safety harness according to claim 1, wherein said retraction reel means comprises twin strap-receiving spools each receiving said second end of a respective one of said two shoulder straps, said twin spools being arranged to rotate as a unit and having a common inertia lock.

3. A seat safety harness according to claim 1, wherein said second ends of said two shoulder straps are united at the back of the seat to form a single strap which is reeled onto said strap-receiving spool means.

4. A seat safety harness according to claim 1, wherein said two strap anchorage points are disposed at opposite sides of the seat back just below the level of a seat occupant's shoulders, said two shoulder straps passing respectively under the seat occupant's armpits to their respective anchorage points.

5. A seat safety harness according to claim 1, wherein said two anchorage points are disposed adjacent the lower end and at opposite sides of the seat.

6. A harness according to claim 5, wherein a two-part connector having two separable parts is provided one part on each strap at an intermediate position along the length of the strap that lies in front of the seat occupant's body, whereby locking together of the two parts of said connector forms a harness configuration comprising two shoulder strap portions and a lap strap portion.

7. A harness according to claim 1, wherein the reel means locks in response to abnormal vehicle accelerations and is placed at the base of the seat back.

8. A harness according to claim 1 wherein the straps are of a material having high energy absorbency and low elastic recovery properties.

References Cited by the Examiner
UNITED STATES PATENTS

| | | | |
|---|---|---|---|
| 894,052 | 7/1908 | Radtke | 297—386 |
| 2,365,626 | 12/1944 | Carlisle | 297—389 |
| 2,403,653 | 7/1946 | Geohegan et al. | |
| 2,576,867 | 11/1951 | Wilson. | |
| 2,634,802 | 4/1953 | Stumm | 297—386 |
| 2,705,586 | 4/1955 | Young. | |
| 2,708,966 | 5/1955 | Davis | 297—386 |
| 2,825,581 | 3/1958 | Knight | 297—386 X |
| 2,845,233 | 7/1958 | Pfankuch et al. | 297—386 |
| 2,850,082 | 9/1958 | Day | 291—386 |
| 2,864,437 | 12/1958 | Spring | 297—386 |
| 3,091,496 | 5/1963 | Bentley | 297—386 |
| 3,178,136 | 4/1965 | Bayer. | |
| 3,218,104 | 11/1965 | Putman | 297—389 |

CASMIR A. NUNBERG, *Primary Examiner.*

JAMES T. McCALL, *Examiner.*